(12) United States Patent
Zhang et al.

(10) Patent No.: US 11,216,523 B2
(45) Date of Patent: Jan. 4, 2022

(54) METHOD, SYSTEM, SERVER AND INTELLIGENT TERMINAL FOR AGGREGATING AND DISPLAYING COMMENTS

(71) Applicant: BEIJING DAJIA INTERNET INFORMATION TECHNOLOGY CO., LTD., Beijing (CN)

(72) Inventors: Yang Zhang, Beijing (CN); Yixiao Cheng, Beijing (CN); Xian Li, Beijing (CN); Hongzhi Ma, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/907,938

(22) Filed: Jun. 22, 2020

(65) Prior Publication Data

US 2020/0327176 A1    Oct. 15, 2020

Related U.S. Application Data

(63) Continuation of application No. PCT/CN2018/117444, filed on Nov. 26, 2018.

(30) Foreign Application Priority Data

Dec. 21, 2017  (CN) .......................... 201711392469.4

(51) Int. Cl.
*G06F 16/958* (2019.01)
*G06F 16/9536* (2019.01)
(Continued)

(52) U.S. Cl.
CPC ........ *G06F 16/9535* (2019.01); *G06F 16/958* (2019.01); *G06F 16/9536* (2019.01); *G06F 16/345* (2019.01)

(58) Field of Classification Search
None
See application file for complete search history.

(56) References Cited

U.S. PATENT DOCUMENTS

| | | | |
|---|---|---|---|
| 6,912,530 B1 * | 6/2005 | Hanson | G06F 16/256 |
| 2016/0094680 A1 | 3/2016 | Lu et al. | |
| 2017/0249384 A1 | 8/2017 | Kandylas et al. | |
| 2020/0007944 A1 | 1/2020 | | |

FOREIGN PATENT DOCUMENTS

| | | |
|---|---|---|
| CN | 103688513 A | 3/2014 |
| CN | 104618813 A | 5/2015 |
| CN | 105578209 A | 5/2016 |

(Continued)

OTHER PUBLICATIONS

DougW, Stack trace bug aggregation software Mar. 17, 2011, stackoverflow, https://stackoverflow.com/questions/3346063/stack-trace-bug-aggregation-software.*

(Continued)

*Primary Examiner* — Jason G Liao
(74) *Attorney, Agent, or Firm* — Meunier Carlin & Curfman LLC

(57) ABSTRACT

Disclosed are a method, a system, a server and an intelligent terminal for aggregating and displaying comments. The method includes: obtaining multimedia interactive information to be displayed; generating aggregated comments with same types of multimedia interactive information in the multimedia interactive information based on a preset aggregated rule; transmitting the aggregated comments to a client for displaying; obtaining a sharing path for a user to share data; and publishing the aggregated comments in a comment area of different sharing platforms or a comment area of applications based on the sharing path, wherein the sharing path comprises network links for sharing same data to the different sharing platforms or the applications.

15 Claims, 7 Drawing Sheets

(51) Int. Cl.
  *G06F 16/34* (2019.01)
  *G06F 16/9535* (2019.01)

(56) References Cited

FOREIGN PATENT DOCUMENTS

| | | |
|---|---|---|
| CN | 105684455 A | 6/2016 |
| CN | 105959811 A | 9/2016 |
| CN | 106101848 A | 11/2016 |
| CN | 106559695 A | 4/2017 |
| CN | 106993229 A | 7/2017 |
| CN | 107484025 A | 12/2017 |
| CN | 108156148 A | 6/2018 |
| CN | 108965345 A * | 12/2018 |

OTHER PUBLICATIONS

Bullet Screens Jan. 4, 2018 GlobalTimes, http://www.globaltimes.cn/content/1083334.shtml.*
Lin et al., 'Bullet Screen' video-sharing web in China&Japan Jan. 25, 2016, YouTube https ://www.youtube.com/watch?v=O1PmZx3rjR4.*
M3t30r0, GundeadliGne—Demonic Challenge (Balmya) Jan. 12, 2012, YouTube, https://www.youtube.com/watch?v=eeluD4sqJWU.*
Drum Know Your Memes, China Edition Dec. 26, 2018, Mother Jones, https://www.motherjones.com/kevin-drum/2018/12/know-your-memes-china-edition/.*
International Search Report and Written Opinion issued by the International Searching Authority (ISA/CN in PCT Application No. PCT/CN2018/117444 dated Feb. 11, 2019. 10 pages, including English translation of International Search Report.

* cited by examiner

METHOD, SYSTEM, SERVER AND INTELLIGENT TERMINAL FOR AGGREGATING AND DISPLAYING COMMENTS

CROSS-REFERENCE TO RELATED APPLICATIONS

This application is a continuation of International Application No. PCT/CN2018/117444, filed on Nov. 26, 2018, which is based on and claims priority under 35 U.S.C 119 to China Patent Application No. 201711392469.4, filed on Dec. 21, 2017 and titled "Method, System, Server and Intelligent Terminal for Aggregating and Displaying Comments", in the China National Intellectual Property Administration. The disclosure of above application is herein incorporated by reference in their entireties.

FIELD

The present disclosure relates to the field of data processing, and more particularly relates to a method, a system, a server and an intelligent terminal for aggregating and displaying comments.

BACKGROUND

With the advancement of computer technologies, both the information diffusion speed and the diffusion range have been developed by leaps and bounds. Users can show their private data to everyone to watch and browse through a live-broadcasting platform or a sharing platform. After watching the data, a viewer or a browser will often make comments on the shared data, and comment information will be displayed in a comment region in different ways.

SUMMARY

The present disclosure provides a method, a system, a server and an intelligent terminal for aggregating and displaying comments capable of aggregating and displaying the same type of multimedia interactive information.

According to an embodiment of the present disclosure, the disclosure provides a method for aggregating and displaying comments, applied to a server and including the following steps:

obtaining multimedia interactive information to be displayed;

generating aggregated comments with same types of multimedia interactive information in the multimedia interactive information based on a preset aggregated rule; and transmitting the aggregated comments to a client for displaying.

According to an embodiment of the disclosure, the method further includes:

sorting the aggregated comments in descending order based on the number of aggregations; and storing at least one aggregated comment ranked within a pre-defined filtering rule.

According to an embodiment of the disclosure, the method further includes the following steps:

obtaining the multimedia interactive information within a preset first threshold interval;

generating a first aggregated comment with same types of multimedia interactive information in the multimedia interactive information based on the preset aggregated rule; and transmitting the first aggregated comment to the client for displaying in a bullet screen region.

According to an embodiment of the disclosure, the method further includes:

obtaining a second aggregated comment within a preset second threshold interval based on the preset aggregated rule;

comparing whether the first aggregated comment is the same as the second aggregated comment;

generating a third aggregated comment by aggregating the second aggregated comment and the first aggregated comment based on that the first aggregating comment is same with the second aggregated comment; and transmitting the third aggregated comment to the client.

According to an embodiment of the disclosure, the method further includes:

obtaining a second aggregated comment within a preset second threshold interval based on the preset aggregated rule;

comparing whether the first aggregated comment is the same as the second aggregated comment; and transmitting the second aggregated comment to the client based on that the first aggregated comment is different from the second aggregated comment.

According to an embodiment of the disclosure, the method further includes:

obtaining a sharing path for a user to share data; and publishing the aggregated comments in a comment area of different sharing platforms or a comment area of applications based on the sharing path, wherein the sharing path comprises network links for sharing same data to the different sharing platforms or the applications.

The embodiments of the present disclosure provide a method for aggregating and displaying comments of a client, which is applied to the client and includes the following steps:

transmitting a request for obtaining multimedia interactive information to a server, wherein the server is configured to generate aggregated comments with same types of multimedia interactive information in the multimedia interactive information based on a preset aggregated rule in response to the request;

obtaining the aggregated comments transmitted from the server; and displaying the aggregated comments.

According to an embodiment of the disclosure, the method further includes:

the server is configured to sort the aggregated comments in descending order based on the number of aggregations; and store at least one aggregated comment ranked within a pre-defined filtering rule in response to the request.

According to an embodiment of the disclosure, the method further includes the following steps:

transmitting the request to the server, wherein the server is configured to, within a preset first threshold interval, generate a first aggregated comment with same types of multimedia interactive information in the multimedia interactive information based on the preset aggregated rule in response to the request;

obtaining the first aggregated comment transmitted from the server; and displaying the first aggregated comment in a bullet screen region.

According to an embodiment of the disclosure, the method further includes the following steps:

transmitting the request to the server, wherein the server is configured to, within a preset second threshold interval, generate a second aggregated comment with same types of multimedia interactive information in the multimedia interactive information based on the preset aggregated rule in response to the request; wherein the server is configured to compare the first aggregated comment with the second aggregated comment, and generate a third aggregated comment by aggregating the second aggregated comment and the first aggregated comment based on that the first aggregating comment is same with the second aggregated comment;

obtaining the third aggregated comment transmitted from the server; and displaying the third aggregated comment in the bullet screen region.

According to an embodiment of the disclosure, the method further includes the following steps:

transmitting the request to the server, wherein the server is configured to, within a preset second threshold interval, generate a second aggregated comment with same types of multimedia interactive information in the multimedia interactive information based on the preset aggregated rule in response to the request; wherein the server is configured to compare the first aggregated comment with the second aggregated comment, and transmit the second aggregated comment to the client based on that the first aggregated comment is different from the second aggregated comment;

obtaining the second aggregated comment transmitted from the server; and displaying the second aggregated comment in the bullet screen region.

According to an embodiment of the disclosure, the method further includes the following steps:

transmitting a sharing path for sharing data to the server, wherein the server is configured to publish the aggregated comments in a comment area of different sharing platforms or a comment area of applications based on the sharing path, wherein the sharing path comprises network links for sharing same data to the different sharing platforms or the applications.

The embodiments of the present disclosure further provide a system for aggregating and displaying comments, applied to a server and including:

an obtaining module, configured to obtain multimedia interactive information to be displayed;

a processing module, configured to generate aggregated comments with same types of multimedia interactive information in the multimedia interactive information based on a preset aggregated rule; and an execution module, configured to transmit the aggregated comments to a client for displaying.

According to an embodiment of the disclosure, the system further includes:

a first sorting sub-module, configured to sort the aggregated comments in descending order based on the number of aggregations; and a first filtering sub-module, configured to store at least one aggregated comment ranked within a pre-defined filtering rule.

According to an embodiment of the disclosure, the system further includes:

a first obtaining sub-module, configured to obtain the multimedia interactive information within a preset first threshold interval;

a first processing sub-module, configured to generate a first aggregated comment with same types of multimedia interactive information in the multimedia interactive information based on the preset aggregated rule; and a first execution sub-module, configured to transmit the first aggregated comment to the client for displaying in a bullet screen region.

According to an embodiment of the disclosure, the system further includes:

a second processing sub-module, configured to obtaining a second aggregated comment within a preset second threshold interval based on the preset aggregated rule;

a first comparison sub-module, configured to compare whether the first aggregated comment is the same as the second aggregated comment; and a second execution sub-module, configured to generate a third aggregated comment by aggregating the second aggregated comment and the first aggregated comment based on that the first aggregating comment is same with the second aggregated comment; and transmit the third aggregated comment to the client.

According to an embodiment of the disclosure, the system further includes:

a third processing sub-module, configured to obtain a second aggregated comment within a preset second threshold interval based on the preset aggregated rule;

a second comparison sub-module, configured to compare whether the first aggregated comment is the same as the second aggregated comment; and a third execution sub-module, configured to transmit the second aggregated comment to the client based on that the first aggregated comment is different from the second aggregated comment.

According to an embodiment of the disclosure, the system further includes:

a second obtaining sub-module, configured to obtain a sharing path for a user to share data; and a publishing sub-module, configured to publish the aggregated comments in a comment area of different sharing platforms or a comment area of applications based on the sharing path, wherein the sharing path comprises network links for sharing same data to the different sharing platforms or the applications.

The embodiments of the present disclosure provide a system for aggregating and displaying comments, applied to a client and including:

a transmission module, configured to transmit a request for obtaining multimedia interactive information to be displayed to a server, wherein the server is configured to generate aggregated comments with same types of multimedia interactive information in the multimedia interactive information based on a preset aggregated rule in response to the request;

a receiving module, configured to obtain the aggregated comments transmitted from the server; and a displaying module, configured to display the aggregated comments.

According to an embodiment of the disclosure, the system further includes:

a first transmission sub-module, configured to transmit the request to the server, wherein the server is configured to sort the aggregated comments in descending order based on the number of aggregations, and store at least one aggregated comment ranked within a pre-defined filtering rule in response to the request.

According to an embodiment of the disclosure, the system further includes:

a second transmission sub-module, configured to transmit the request to the server, wherein the server is configured to, within a preset first threshold interval, generate a first aggregated comment with same types of multimedia interactive information in the multimedia interactive information based on the preset aggregated rule in response to the request;

a first receiving sub-module, configured to obtain the first aggregated comment transmitted from the server; and a first displaying sub-module, configured to display the first aggregated comment in a bullet screen region.

According to an embodiment of the disclosure, the system further includes:

a third transmission sub-module, configured to transmit the request to the server, wherein the server is configured to, within a preset second threshold interval, generate a second aggregated comment with same types of multimedia interactive information in the multimedia interactive information based on the preset aggregated rule in response to the request; wherein the server is configured to compare the first aggregated comment with the second aggregated comment, and generate a third aggregated comment by aggregating the second aggregated comment and the first aggregated comment based on that the first aggregating comment is same with the second aggregated comment;

a second receiving sub-module, configured to obtain the third aggregated comment transmitted from the server; and a second displaying sub-module, configured to display the third aggregated comment in the bullet screen region.

According to an embodiment of the disclosure, the system further includes:

a fourth transmission sub-module, configured to transmit the request to the server, wherein the server is configured to, within a preset second threshold interval, generate a second aggregated comment with same types of multimedia interactive information in the multimedia interactive information based on the preset aggregated rule in response to the request; wherein the server is configured to compare the first aggregated comment with the second aggregated comment, and transmit the second aggregated comment to the client based on that the first aggregated comment is different from the second aggregated comment;

a third receiving sub-module, configured to obtain the second aggregated comment transmitted from the server; and a third displaying sub-module, configured to display the second aggregated comment in the bullet screen region.

According to an embodiment of the disclosure, the system further includes:

a fifth transmission sub-module, configured to transmit a sharing path for sharing data to the server, wherein the server is configured to publish the aggregated comments in a comment area of different sharing platforms or a comment area of applications based on the sharing path, wherein the sharing path comprises network links for sharing same data to the different sharing platforms or the applications.

The embodiments of the present disclosure further provide a system for aggregating and displaying comments, applied to a server and including:

one or more processors;

a memory; and one or more application programs, wherein the one or more application programs are stored in the memory and configured to be executed by the one or more processors. The one or more application programs are configured to execute the foregoing method for aggregating and displaying comments.

The embodiments of the present disclosure further provide a server, including:

one or more processors;

a memory; and one or more application programs, wherein the one or more application programs are stored in the memory and configured to be executed by the one or more processors. The one or more application programs are configured to execute the foregoing method for aggregating and displaying comments.

The embodiments of the present disclosure further provide an intelligent terminal, including:

one or more processors;

a memory; and one or more application programs, wherein the one or more application programs are stored in the memory and configured to be executed by the one or more processors. The one or more application programs are configured to execute the foregoing method for aggregating and displaying comments for the client.

BRIEF DESCRIPTION OF THE DRAWINGS

To describe the embodiments of the present disclosure and the technical solutions in the existing art more clearly, drawings required to be used in the embodiments or the existing art will be briefly introduced below. Apparently, the drawings in the illustration below are only some embodiments of the present disclosure. Those of ordinary skill in the art can also obtain other drawings according to these drawings without doing creative work.

DETAILED DESCRIPTION OF THE EMBODIMENTS

To make the objectives, technical solutions and advantages of the present disclosure clearer, the present disclosure is further described below in detail with reference to accompanying drawings and embodiments. It is apparent that the described embodiments are a part of the embodiments of the present disclosure, not all the embodiments. Based on the embodiments in the present disclosure, all other embodiments obtained by those of ordinary skill in the art without doing creative work shall fall within the protection scope of the present disclosure.

Figure 1:
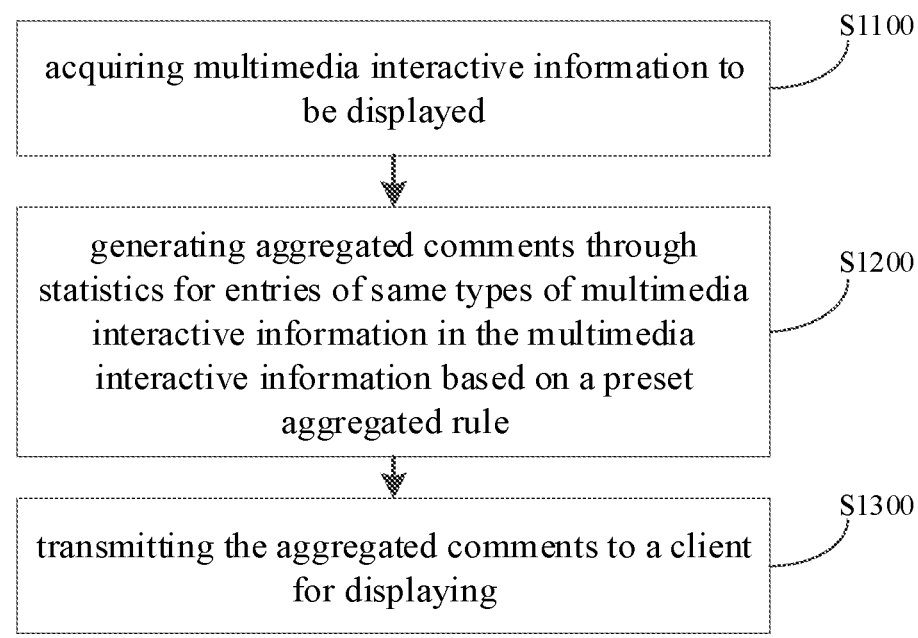
FIG. 1 illustrates a schematic diagram of a basic flow of a method for aggregating and displaying comments for a server according to an embodiment of the disclosure.

Referring to FIG. 1, FIG. 1 illustrates a schematic diagram of a basic flow of a method for aggregating and displaying comments for a server according to the embodiment.

As shown in FIG. 1, a method for aggregating and displaying comments includes the following steps:

S1100, acquiring multimedia interactive information to be displayed.

The multimedia interactive information may be comment information of a user, and includes (but is not limited to): words, pictures, motion graphs or short videos. The multimedia interactive information in the live broadcasting field further includes: gift pictures and animated effects of gifts. The multimedia interactive information is not limited to the above types, and may also include other types. It is not limited here.

The multimedia interactive information to be displayed may be multimedia interactive information that is uploaded by a client of a viewer or a visitor. But the multimedia interactive information to be displayed is not confirmed by the server, and is displayed on a platform or a link (such as a live broadcasting room or a personal Weibo).

The multimedia interactive information to be displayed may be cached in the server. The server may constantly acquire the multimedia interactive information in a regular refreshing manner (such as refreshing once every 1 s). The server takes the acquired multimedia interactive information as the multimedia interactive information to be displayed for storing.

S1200, generating aggregated comments through statistics for entries of same types of multimedia interactive information in the multimedia interactive information based on a preset aggregated rule.

The preset aggregated rule is a rule for the statistics for the multimedia interactive information. The aggregated rule may be different based on the different types of multimedia interactive information. The aggregated rule may be customized.

For example, when the aggregated comment information is words, words in the same manner of expressing the meaning in the content are aggregated by understanding the content of word information. For example, digits that have different lengths in content such as 666666, but are repeatedly composed of a uniform character are uniformly aggregated into a character string of 666, and then the number of aggregations of this type of character string is counted.

When the aggregated comment information is words, the aggregated comment information may also be aggregated by means of comparing Hamming distances of different comment words to acquire ASCII character strings indicating comment word information. The Hamming distances of the ASCII character strings in different comment word information are compared. When the Hamming distances are less than a set threshold (such as 10, 20, or 25), comment languages meeting this condition are aggregated, and then the number of aggregations is counted.

When the aggregated comment information is pictures, motion graphs, gifts or animations of the gifts, resources may be provided based on a uniform platform or application software have a uniform serial number. Resources with the same serial numbers are aggregated by identifying the serial numbers of the above resources, and then the number of aggregations is counted.

In some embodiments, when the user makes a comment with picture, video or motion graph information without a uniform serial number, the above images may be identified. A technical solution which can be used is that: the pictures, motion graphs and videos with the same classification results are aggregated by using a convolutional neural network model, and then the number of aggregations is counted.

The aggregated comment information is a set of several same types of data. An external expression of a data structure of the set may be commonly expressed by combining the multimedia interactive information and the number of aggregations. For example: 666*88, that is, comments 666 appear 88 times in total. The aggregated comment information may be a set composed of several pieces of information in this type of format.

S1300, transmitting the aggregated comments to a client for displaying.

After statistics of the aggregated comment information are completed, a result is transmitted to the client that requests to acquire the aggregated comment information. The transmission in the embodiment may be broadcasting, or may be other transmitting manners. When the client requests to access the server, and after the client establishes linkage to the server, the server may transmit the aggregated comment information to the client based on the request of the client, and may also regularly broadcast the aggregated comment information to the client. It is not limited here.

After receiving the aggregated comment information, the client may display it in different manners. For example, during video playing or live broadcasting, the aggregated comment information may be displayed in the form of bullet screens. During the live broadcasting, the aggregated comment information may be displayed in a comment region of the live broadcast or displayed in a comment region of a Weibo.

Figure 2:
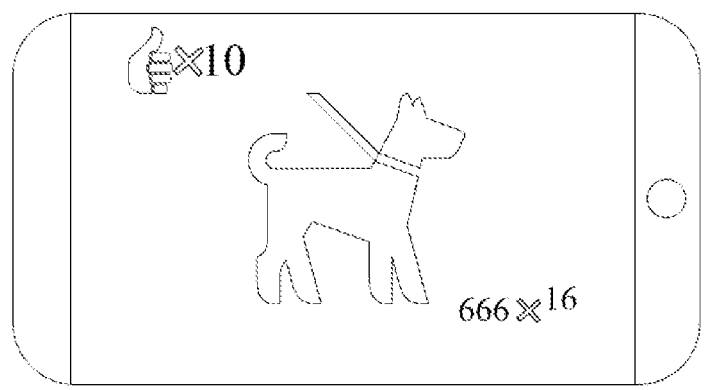
FIG. 2 illustrates a schematic diagram that a client displays aggregated comments in the form of bullet screens according to an embodiment of the disclosure.
Figure 3:
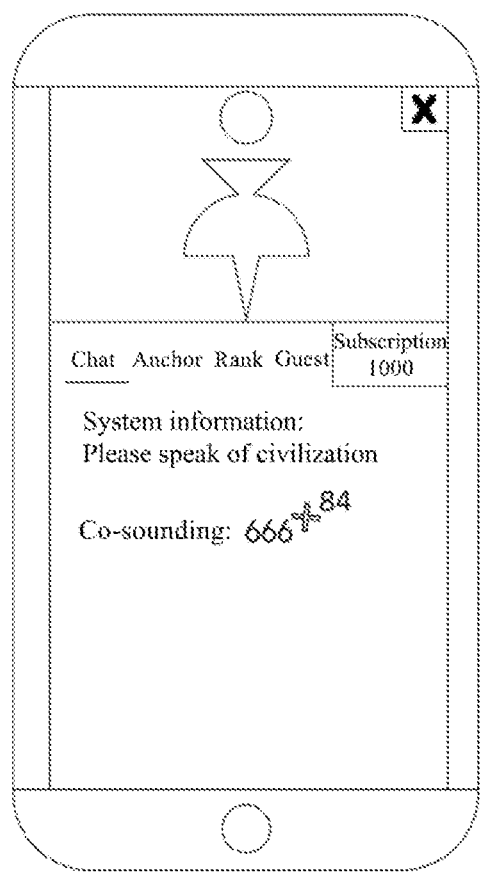
FIG. 3 illustrates a schematic diagram that a client displays aggregated comments through a comment region according to an embodiment of the disclosure.
Figure 4:
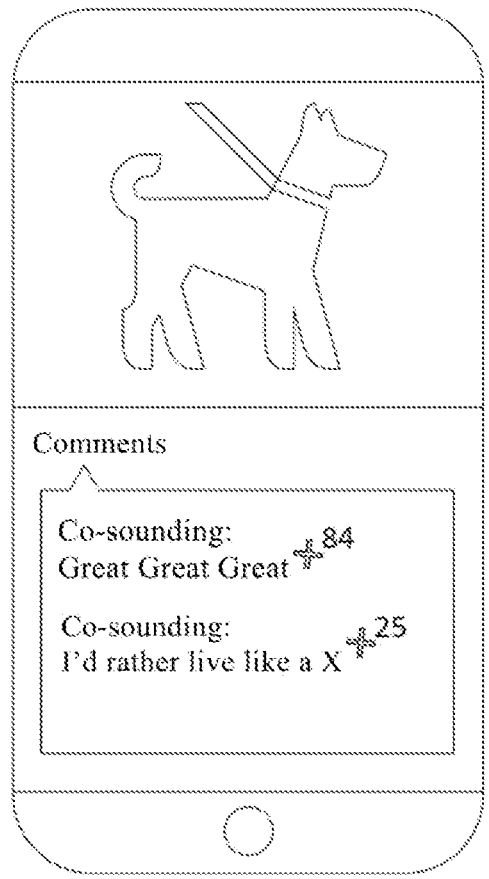
FIG. 4 illustrates a schematic diagram that a client displays aggregated comments through a static comment region according to an embodiment of the disclosure.

Referring to FIG. 2, FIG. 3 and FIG. 4, FIG. 2 illustrates a schematic diagram that a client displays aggregated comments in the form of bullet screens according to the embodiment. FIG. 3 illustrates a schematic diagram that a client displays aggregated comments through a comment region according to the embodiment. FIG. 4 illustrates a schematic diagram that a client displays aggregated comments through a static comment region according to the disclosure.

As shown in FIG. 2, the client displays an image of the aggregated comments "thumb image*10" on video bullet screens.

As shown in FIG. 3, the client displays numerical information of a numerical string "666*84" of the aggregated comments in the comment region.

As shown in FIG. 4, the client displays character information of the aggregated comments "Great Great Great" in the static comment region.

According to the foregoing implementation, through statistics for entries of same types of multimedia interactive information in the multimedia interactive information to be displayed based on a preset aggregated rule, the data volume in the comment information is compressed and gathered and repeated comments are greatly reduced, thereby reducing the complexity of the aggregated comment information and substantially increasing the amount of information.

In some embodiments, the server may transmit partial aggregated comment information to the client. In some embodiments, the server may determine the number of aggregations of the aggregated comment information according to a statistical result, after the statistic for entries of same types of multimedia interactive information in the multimedia interactive information to be displayed is completed. In this way, each piece of aggregated comment information formed corresponds to one number of aggregations.

The number of aggregations that satisfies a pre-defined filtering rule is selected from the determined number of aggregations. The filtering rule may be customized. At least one aggregated comment corresponding to the selected number of aggregations is stored, and the stored aggregated comment is transmitted to the client.

For example, the aggregated comment information formed based on the aggregated rule includes words, pictures, motion graphs and gifts. Words are aggregated for 60 times, pictures are aggregated for 80 times, motion graphs are aggregated for 90 times, and gifts are aggregated for 100 times. The filtering rule is two maximum numbers of the determined numbers of aggregations, the numbers of aggregations satisfying the filtering rule are 100 times and 90 times, and the gifts and the motion graphs are stored and transmitted to the client.

Figure 5:
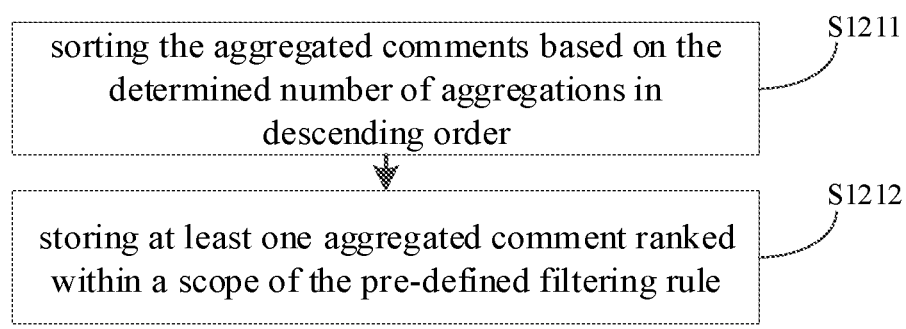
FIG. 5 illustrates a schematic flow diagram of filtering aggregated comments according to an embodiment of the disclosure.

In some embodiments, the step of selecting the number of aggregations that satisfies a pre-defined filtering rule from the determined number of aggregations, and storing at least one aggregated comment corresponding to the selected number of aggregations specifically refers to FIG. 5. FIG. 5 illustrates a schematic flow diagram of filtering the aggregated comments according to the embodiment.

As shown in FIG. 5, after the step S2200, the following steps are further included.

S1211, sorting the aggregated comments based on the determined number of aggregations in descending order.

The server sorts the aggregated comment information after the statistics are completed based on the determined number of aggregations of the aggregated comment information by means of power descending.

S1222, storing at least one aggregated comment ranked within a scope of the pre-defined filtering rule.

The filtering rule is a set filtering standard, and may be customized. For example, the filtering rule is to select two pieces of aggregated comment information ranked previously. However, it is not limited to this. The selected number set by the filtering rule is not limited to this. The selected number of the filtering rule may be any value. Filtering conditions of the filtering rule are not limited to the number of pieces of the acquired aggregated comment information, either. In some embodiments, the filtering rule may be to perform extraction for the types of the multimedia interactive information based on different specific application environments. For example, the filtering rule may be (but is not limited to): the word-type of aggregated comment information is extracted only, the picture-type of aggregated comment information is extracted only, or the video-type of aggregated comment information is extracted only.

In some embodiments, the aggregated comment information may also be sorted based on the determined number of aggregations in descending order, and the aggregated comment information ranked within the scope of the filtering rule is stored based on the filtering rule.

At this time, the filtering rule may filter the aggregated comment information from the last piece of aggregated comment information towards a front ranking direction in sequence. For example, the filtering rule may set that: the last three ranked pieces are within the scope of the filtering rule.

By filtering the aggregated comment information, data may be further downsized. At the same time, the aggregated comment information is selected based on set conditions, and comments with a relatively large amount of information may be directionally extracted, thereby improving the quality of displayed comments.

In some embodiments, the method for aggregating and displaying comments may be applied to the field of video playing, and may also be applied to other fields. It is not limited here. The following is introduced by taking the field of video playing as an example. Specifically referring to FIG. 6, FIG. 6 illustrates a schematic diagram of a basic flow of a video playing-based method for aggregating and displaying comments according to the embodiments.

Figure 6:
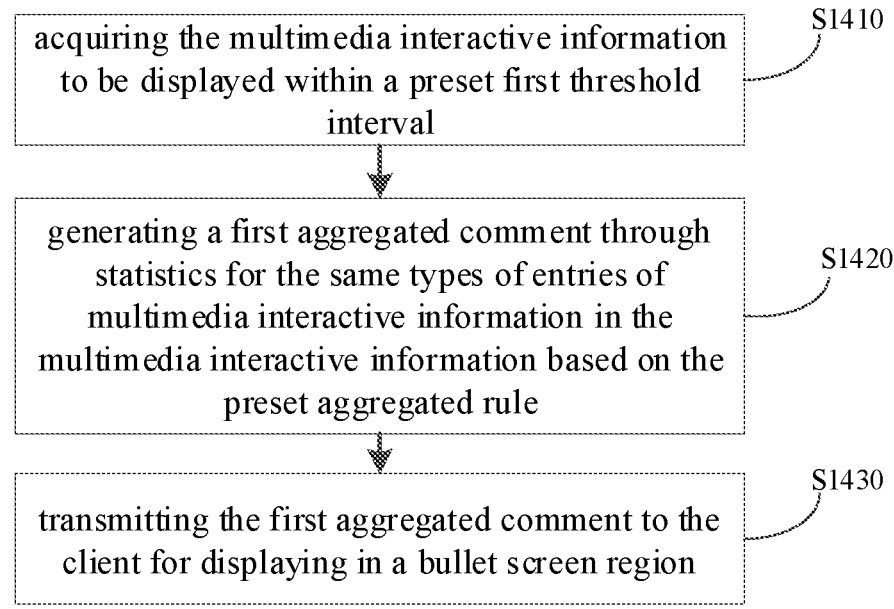
FIG. 6 illustrates a schematic diagram of a basic flow of a video playing-based method for aggregating and displaying comments according to an embodiment of the disclosure.

As shown in FIG. 6, the method for aggregating and displaying comments may further include the following steps:

S1410, acquiring the multimedia interactive information to be displayed within a preset first threshold interval.

The first threshold interval is a set interval for refreshing the multimedia interactive information. For example, the first threshold interval is 1 s, which indicates that a refreshing interval of the multimedia interactive information is set to be 1 s, and s expresses second. However, it is not limited to this. The value of the first threshold interval is not limited to this. The value of the first threshold interval may be customized based on different specific application scenes. For example, it may be any value.

For example, the server refreshes the multimedia interactive information once every 1 s. During the statistics for the aggregated comment information, the aggregated comment information within the first threshold interval, i.e., 1 s, is obtained through the statistics.

S1420, generating a first aggregated comment through statistics for the same types of entries of multimedia interactive information in the multimedia interactive information based on the preset aggregated rule.

The preset aggregated rule is a rule for the statistics for the multimedia interactive information. The aggregated rule may be different based on different types of the multimedia interactive information. The aggregated rule may be customized.

For example, when the aggregated comment information is words, words in the same manner of expressing the meaning in the content are aggregated by understanding the content of word information. For example, digits that have different lengths in content such as 666666, but are repeatedly composed of a uniform character are uniformly aggregated into a character string of 666, and then the number of aggregations is counted.

When the aggregated comment information is words, the aggregated comment information may also be aggregated by means of comparing Hamming distances of different comment words to acquire ASCII character strings indicating comment word information. The Hamming distances of the ASCII character strings in different comment word information are compared. When the Hamming distances are less than a set threshold (such as 10, 20, or 25), comment languages meeting this condition are aggregated, and then the number of aggregations is counted.

When the aggregated comment information is pictures, motion graphs, gifts or animations of the gifts, resources may be provided based on a uniform platform or application software have a uniform serial number. Resources with the same serial numbers are aggregated by identifying the serial numbers of the above resources, and then the number of aggregations is counted.

In some embodiments, when a user makes a comment with picture, video or motion graph information without a uniform serial number, the above images may be identified. A technical solution which can be used is that: the pictures, motion graphs and videos with the same classification results are aggregated by using a convolutional neural network model, and then the number of aggregations is counted.

The aggregated comment information is a set of several same types of data. An external expression of a data structure of the set may be commonly expressed by combining the multimedia interactive information and the number of aggregations. For example: 666*88, that is, comments 666 appear 88 times in total. The aggregated comment information may be a set composed of several pieces of information in this type of format.

The aggregated comment information acquired through statistics for the entries of multimedia interactive information to be displayed within the first threshold interval is the first aggregated comment information. That is, the first aggregated comment information aims at the multimedia interactive information to be displayed within the first threshold interval.

S1430, transmitting the first aggregated comment to the client for displaying in a bullet screen region.

After receiving the first aggregated comment information, the client may play the first aggregated comment information in the bullet screen region.

In some embodiments, the aggregated comments may be updated. Specifically referring to FIG. 7, FIG. 7 illustrates a schematic flow diagram of a first implementation of updating the aggregated comments in the video playing-based method for aggregating and displaying comments according to the embodiment.

Figure 7:
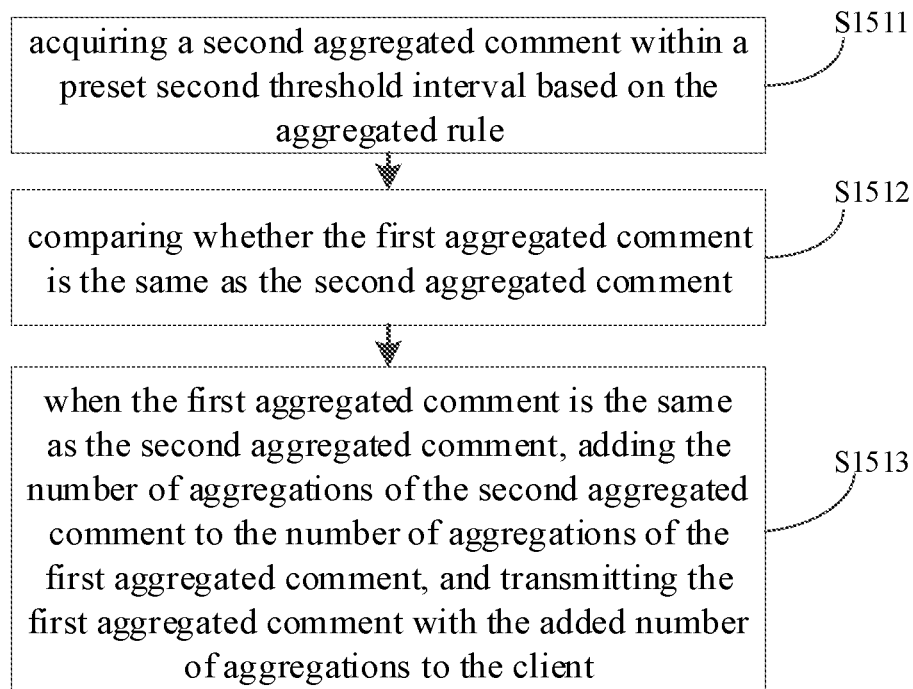
FIG. 7 illustrates a schematic flow diagram of a first implementation of updating aggregated comments in the video playing-based method for aggregating and displaying comments according to an embodiment of the disclosure.

As shown in FIG. 7, after the step S1430, the following steps are further included.

S1511, acquiring a second aggregated comment within a preset second threshold interval based on the aggregated rule.

The duration of a first threshold interval may be the same as the duration of the second threshold interval. The second threshold interval is a next interval adjacent to the first threshold interval, i.e., a time period from the end of the first threshold interval to the next refreshing after the multimedia interactive information is refreshed.

For example, if the first threshold interval is 1 s, the second threshold interval is 1 s. The first threshold interval ends at the 12th second, and the next refreshing is performed at the 13th second, then the second threshold interval is a duration from the 12th second and the 13th second.

The refreshed multimedia interactive information within the second threshold interval is acquired, and the acquired multimedia interactive information is aggregated based on the aggregated rule. The aggregated comment information aggregated within the second threshold interval is the second aggregated comment information.

S1512, comparing whether the first aggregated comment is the same as the second aggregated comment.

The server may compare the first aggregated comment information with the second aggregated comment information, and may compare them in different ways for different types of aggregated comment information. A way of comparison may be: for wordy aggregated comment information, the comparison may be performed by understanding word meanings or through the Hamming distances. For pictures and videos, it may be compared whether serial numbers or classification information are/is consistent. However, it is not limited to this. The first aggregated comment information and the second aggregated comment information which may be applicable to this technology may be compared through any similar pair comparison technology in the prior art.

S1513, when the first aggregated comment is the same as the second aggregated comment, adding the number of aggregations of the second aggregated comment to the number of aggregations of the first aggregated comment, and transmitting the first aggregated comment with the added number of aggregations to the client.

When a compared result indicates that the first aggregated comment information is the same as the second aggregated comment information, the number of aggregations of the second aggregated comment information are added to the first aggregated comment information, that is to say, third aggregated comment information is generated by aggregating the second aggregated comment information and the first aggregated comment information. For example, if the first aggregated comment information is "666*84", and the second aggregated comment information is "666*16", the first aggregated comment information with the added number of aggregations is "666*100", namely, the third aggregated comment information is "666*100".

The client receives the first aggregated comment information with the added number of aggregations, and displays the first aggregated comment information with the added number of aggregations in bullet screens. For example, the aggregated comment information "666*100" is displayed. In some embodiments, the method is used for "double hit" operation.

Figure 8:
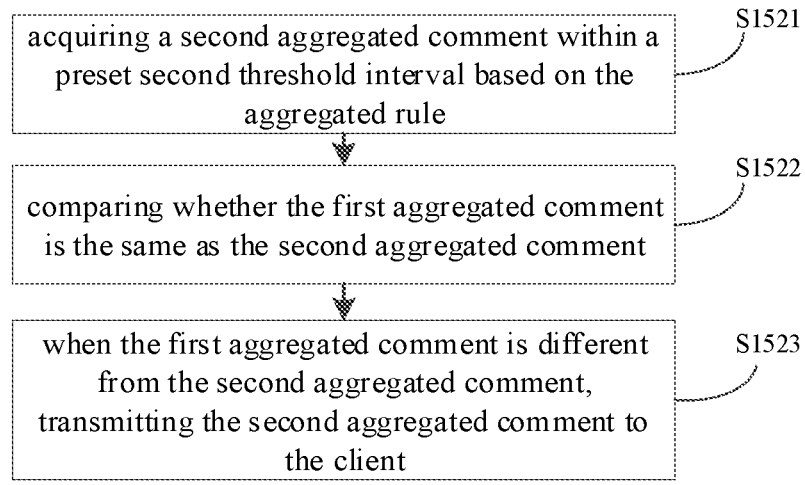
FIG. 8 illustrates a schematic flow diagram of a second implementation of updating aggregated comments in the video playing-based method for aggregating and displaying comments according to an embodiment of the disclosure.

Specifically referring to FIG. 8, FIG. 8 illustrates a schematic flow diagram of a second implementation of updating the aggregated comments in the video playing-based method for aggregating and displaying comments according to the embodiment.

As shown in FIG. 8, after the step S1430, the following steps are further included.

S1521, acquiring a second aggregated comment within a preset second threshold interval based on the aggregated rule.

The duration of a first threshold interval may be the same as the duration of the second threshold interval. The second threshold interval is a next interval adjacent to the first threshold interval, i.e., a time period from the end of the first threshold interval to the next refreshing after the multimedia interactive information is refreshed.

The refreshed multimedia interactive information is aggregated within the second threshold interval. The aggregated comment information aggregated within the second threshold interval is second aggregated comment information.

S1522, comparing whether the first aggregated comment is the same as the second aggregated comment.

The server may compare the first aggregated comment information with the second aggregated comment information, and may compare them in different ways for different types of aggregated comment information. A way of comparison may be: for wordy aggregated comment information, the comparison may be performed by understanding word meanings or through the Hamming distances. For pictures and videos, it may be compared whether serial numbers or classification information are/is consistent. However, it is not limited to this. The first aggregated comment information and the second aggregated comment information which may be applicable to this technology may be compared through any similar pair comparison technology in the prior art.

S1523, when the first aggregated comment is different from the second aggregated comment, transmitting the second aggregated comment to the client.

When a compared result indicates that the first aggregated comment information is different from the second aggregated comment information, the server may transmit the second aggregated comment information to the client.

After receiving the second aggregated comment information with the added the number of aggregations, the client may display the second aggregated comment information with the added the number of aggregations in bullet screens.

In some embodiments, a user may share the same data to different sharing platforms or application programs, so that the aggregated comment information may be transferred. Specifically referring to FIG. 9, FIG. 9 illustrates a schematic flow diagram of transferring the aggregated comments according to the embodiment.

Figure 9:
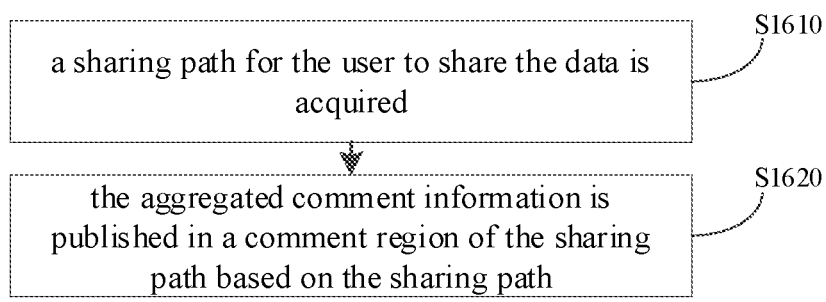
FIG. 9 illustrates a schematic flow diagram of transferring aggregated comments according to an embodiment of the disclosure.

As shown in FIG. 9, after the step S1300, the following steps are further included.

S1610, a sharing path for the user to share the data is acquired.

The sharing path is a path that the user shares the same data into different sharing platforms or application programs. Specifically, the sharing path may be a network link. A page of the data in the corresponding sharing platform or application program may be acquired by accessing this link.

The sharing path may be transmitted by the client to the server, and may also be pre-stored in the server. It is not limited here.

S1620, the aggregated comment information is published in a comment region of the sharing path based on the sharing path.

The sharing path is accessed, and the acquired aggregated comment information is published in the comment region of the sharing path. The aggregated comment information is comment information for the shared data of the sharing path.

For example, a user publishes the aggregated comment information of a certain data in the Weibo. After the same data is published in the Moments of an account of the user, a sharing path of the data in the Moments is acquired, and the aggregated comment information in the Weibo may be published in a comment region of the Moments according to the sharing path. For example, if the aggregated comment information published in the Weibo is "electrifying electrifying electrifying*56", the "electrifying electrifying electrifying*56" is published in the comment region of the Moments based on the sharing path of the Moments.

In some embodiments, when various types of aggregated comment information for the shared data are included, all the types of aggregated comment information are published in the comment region of the sharing path, or only a part of the aggregated comment information may be published in the comment region of the sharing path. When only a part of the aggregated comment information is published in the comment region of the sharing path, partial aggregated comment information in this part of the aggregated comment information may be selected according to a preset rule, and the preset rule may be customized. For example, only the aggregated comment information with the number of aggregations ranked at the first place or only the aggregated comment information with the top three numbers of aggregations is selected, and the selected aggregated comment information is published in the comment region of the sharing path.

The embodiment further provides a method for aggregating and displaying comments, applied to a client. The client transmits a corresponding request to a server, and the server transmits corresponding aggregated comments to the client in response to the request. The client displays the aggregated comments.

The transmission in this embodiment may be broadcasting, or may be other transmission manners. When the client asks to access the server, and after the client establishes linkage to the server, the server may transmit the aggregated comments to the client according to the request of the client, and may also regularly broadcast the aggregated comments to the client. It is not limited here.

Therefore, the client in the embodiment may display the aggregated comments. The acquisition and display of the aggregated comments are described in detail in the method for aggregating and displaying comments for the server of the embodiment, so descriptions thereof will not be repeated here.

In some embodiments, the client transmits a request for acquiring multimedia interactive information to be displayed to the server for acquiring the multimedia interactive information to be displayed in response to the request, and generating aggregated comments through statistics for entries of same types of multimedia interactive information in the multimedia interactive information to be displayed based on a preset aggregated rule;

the aggregated comments transmitted back by the server in response to the request are acquired; and the aggregated comments are displayed according to a preset displaying method.

In some embodiments, before acquiring the aggregated comments transmitted back by the server in response to the request, the method may further include the following steps:

transmitting the request for acquiring the multimedia interactive information to the server for sorting the aggregated comments based on the determined number of aggregations in descending order, and storing at least one aggregated comment ranked within a scope of a filtering rule.

In some embodiments, the method may further include the following steps:

transmitting the request for acquiring the multimedia interactive information to the server for acquiring the multimedia interactive information within a preset first threshold interval, and generating, in response to the request, a first aggregated comment through statistics for the same types of entries of multimedia interactive information in the multimedia interactive information based on the preset aggregated rule;

acquiring the first aggregated comment transmitted back by the server in response to the request; and displaying the first aggregated comment in a bullet screen region.

In some embodiments, the method may further include the following steps:

transmitting the request for acquiring the multimedia interactive information to the server, in response to the request, for acquiring the multimedia interactive information within a preset second threshold interval, generating a second aggregated comment through statistics for the same types of entries of multimedia interactive information in the multimedia interactive information based on the preset aggregated rule, comparing whether the first aggregated comment is the same as the second aggregated comment, and adding the number of aggregations of the second aggregated comment to the number of aggregations of the first aggregated comment, when the first aggregated comment is the same as the second aggregated comment;

acquiring the first aggregated comment with the added number of aggregations transmitted back by the server in response to the request; and displaying the first aggregated comment with the added number of aggregations in the bullet screen region.

In some embodiments, the method may further include the following steps:

transmitting the request for acquiring the multimedia interactive information to the server, in response to the request, for acquiring the multimedia interactive information within a preset second threshold interval, generating a second aggregated comment through statistics for the same types of entries of multimedia interactive information in the multimedia interactive information based on the preset aggregated rule, comparing whether the first aggregated comment is the same as the second aggregated comment, and determining the second aggregated comment as back-transmitted data, when the first aggregated comment is different from the second aggregated comment;

acquiring the second aggregated comment transmitted back by the server in response to the request; and displaying the second aggregated comment in the bullet screen region.

In some embodiments, the method may further include the following steps:

transmitting a sharing path for sharing data to the server for publishing the aggregated comments in a comment region of the sharing path after the server receives the sharing path.

In some embodiments, when the client forwards the same data in different sharing platforms or application programs, the forwarded sharing path is transmitted to the server of a data source. The server may transfer all or part of the aggregated comments in this server to a corresponding comment region of a new sharing platform or application program according to the sharing path.

Through statistics for entries of same types of multimedia interactive information in the multimedia interactive information to be displayed based on a preset aggregated rule, the data volume in the comment information is compressed and gathered and repeated comments are greatly reduced, thereby reducing the complexity of the aggregated comment information and substantially increasing the amount of information.

Figure 10:
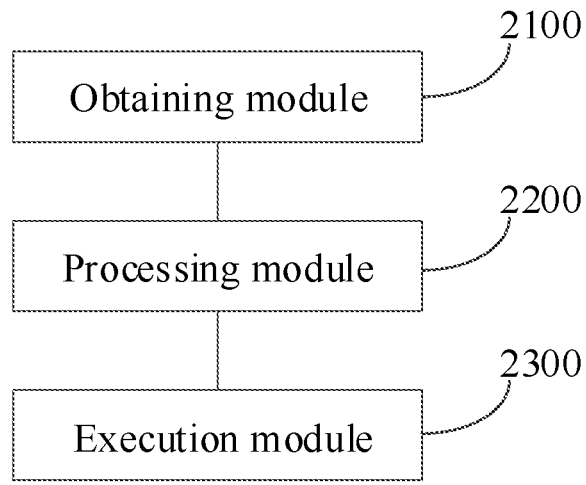
FIG. 10 illustrates a block diagram of a basic structure of a system for aggregating and displaying comments on a server side according to an embodiment of the disclosure.

Referring to FIG. 10, FIG. 10 is a block diagram of a basic structure of a system for aggregating and displaying comments applied to a server according to the embodiment.

As shown in FIG. 10, the system for aggregating and displaying comments includes: an obtaining module 2100, a processing module 2200 and an execution module 2300. The obtaining module 2100 is configured to acquire multimedia interactive information to be displayed; the processing module 2200 is configured to generate aggregated comments with same types of multimedia interactive information in the multimedia interactive information based on a preset aggregated rule; and the execution module 2300 is configured to transmit the aggregated comments to a client for displaying.

Through statistics for entries of same types of multimedia interactive information in the multimedia interactive information to be displayed based on a preset aggregated rule, the data volume in the comment information is compressed and gathered and repeated comments are greatly reduced, thereby reducing the complexity of the aggregated comment information and substantially increasing the amount of information.

In some embodiments, the system further includes: a first sorting sub-module and a first filtering sub-module. The first sorting sub-module is configured to sort the aggregated comments in descending order based on the number of aggregations; and the first filtering sub-module is configured to store at least one aggregated comment ranked within a scope of the filtering rule.

In some embodiments, the system further includes: a first obtaining sub-module, a first processing sub-module and a first execution sub-module. The first obtaining sub-module is configured to obtain the multimedia interactive information within a preset first threshold interval, wherein the first threshold interval is an interval for refreshing the multimedia interactive information; the first processing sub-module, configured to generate first aggregated comment through statistics for the same types of entries of multimedia interactive information in the multimedia interactive information based on the preset aggregated rule; and the first execution sub-module, configured to transmit the first aggregated comment to the client for displaying in a bullet screen region.

In some embodiments, the system further includes: a second processing sub-module, a first comparison sub-module and a second execution sub-module. The second processing sub-module is configured to obtain a second aggregated comment within a preset second threshold interval based on the aggregated rule, wherein the second threshold interval is a next interval adjacent to the first threshold interval; the first comparison sub-module is configured to compare whether the first aggregated comment is the same as the second aggregated comment; and the second execution sub-module is configured to generate a third aggregated comment by aggregating the second aggregated comment and the first aggregated comment based on that the first aggregating comment is same with the second aggregated comment; and transmit the third aggregated comment to the client.

In some embodiments, the system further includes: a third processing sub-module, a second comparison sub-module and a third execution sub-module. The third processing sub-module is configured to obtain a second aggregated comment within a preset second threshold interval based on the aggregated rule; the second comparison sub-module is configured to compare whether the first aggregated comment is the same as the second aggregated comment; and the third execution sub-module is configured to transmit the second aggregated comment to the client when the first aggregated comment is different from the second aggregated comment.

In some embodiments, the system further includes: a second obtaining sub-module and a publishing sub-module. The second obtaining sub-module is configured to obtain a sharing path for a user to share data; and the publishing sub-module is configured to publish the aggregated comments in a comment area of different sharing platforms or a comment area of applications based on the sharing path, wherein the sharing path comprises network links for sharing same data to the different sharing platforms or the applications.

Figure 11:
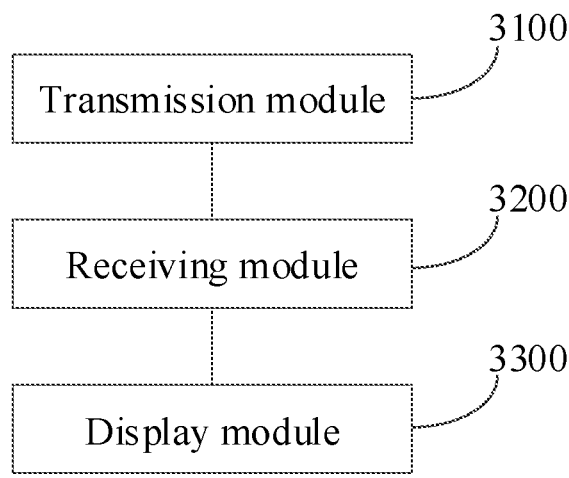
FIG. 11 illustrates a block diagram of a basic structure of a system for aggregating and displaying comments on a terminal side according to an embodiment of the disclosure.

Referring to FIG. 11, FIG. 11 is a block diagram of a basic structure of a system for aggregating and displaying comments applied to a client according to the present embodiment.

As shown in FIG. 11, the system for aggregating and displaying comments includes: a transmission module 3100, a receiving module 3200 and a displaying module 3300. The transmission module 3100 is configured to transmit a request for acquiring multimedia interactive information to be displayed to a server for acquiring the multimedia interactive information in response to the request, and generating aggregated comments through statistics for entries of same types of multimedia interactive information in the multimedia interactive information based on a preset aggregated rule; the receiving module 3200 is configured to acquire the aggregated comments transmitted back by the server in response to the request; and the displaying module 3300 is configured to display the aggregated comments according to a preset displaying method.

In some embodiments, the system further includes: a first transmission sub-module, configured to transmit the request for acquiring the multimedia interactive information to the server for sorting the aggregated comments in descending order based on the number of aggregations, and storing at least one aggregated comment ranked within a scope of a filtering rule.

In some embodiments, the system further includes: a second transmission sub-module, a first receiving sub-module and a first displaying sub-module. The second transmission sub-module is configured to transmit the request for acquiring the multimedia interactive information to be displayed to the server for acquiring the multimedia interactive information within a preset first threshold interval, and generating, in response to the request, a first aggregated comment through statistics for the same types of entries of multimedia interactive information in the multimedia interactive information based on the preset aggregated rule; the first receiving sub-module is configured to acquire the first aggregated comment transmitted back by the server in response to the request; and the first displaying sub-module is configured to display the first aggregated comment in a bullet screen region.

In some embodiments, the system further includes: a third transmission sub-module, a second receiving sub-module and a second displaying sub-module. The third transmission sub-module is configured to transmit the request for acquiring the multimedia interactive information to the server, in response to the request, for acquiring the multimedia interactive information within a preset second threshold interval, generating second aggregated comment through statistics for the same types of entries of multimedia interactive information in the multimedia interactive information based on the preset aggregated rule, comparing whether the first aggregated comment is the same as the second aggregated comment, and generating a third aggregated comment by aggregating the second aggregated comment and the first aggregated comment based on that the first aggregating comment is same with the second aggregated comment; the second receiving sub-module, configured to acquire the third aggregated comments transmitted back by the server in response to the request; and the second displaying sub-module, configured to display the third aggregated comment in the bullet screen region.

In some embodiments, the system further includes: a fourth transmission sub-module, a third receiving sub-module and a third displaying sub-module. The fourth transmission sub-module is configured to transmit the request for acquiring the multimedia interactive information to be displayed to the server, in response to the request, for acquiring the multimedia interactive information within a preset second threshold interval, generating a second aggregated comment through statistics for the same types of entries of multimedia interactive information in the multimedia interactive information based on the preset aggregated rule, comparing whether the first aggregated comment is the same as the second aggregated comment, and determining the second aggregated comment as back-transmitted data, when the first aggregated comment is different from the second aggregated comment; the third receiving sub-module is configured to acquire the second aggregated comment transmitted back by the server in response to the request; and the third displaying sub-module is configured to display the second aggregated comment in the bullet screen region.

In some embodiments, the system further includes: a fifth transmission sub-module, configured to transmit a sharing path for sharing data to the server for publishing the aggregated comments in a comment region of the sharing path after the server receives the sharing path.

Through statistics for entries of same types of multimedia interactive information in the multimedia interactive information to be displayed based on a preset aggregated rule, the data volume in the comment information is compressed and gathered and repeated comments are greatly reduced, thereby reducing the complexity of the aggregated comment information and substantially increasing the amount of information.

The embodiment further provides a system for aggregating and displaying comments. The system includes a client and a server. The client is configured to transmit a request for acquiring multimedia interactive information to be displayed to the server.

the server is configured to receive the request transmitted by the client, acquire the multimedia interactive information in response to the request, generating aggregated comments through statistics for entries of same types of multimedia interactive information in the multimedia interactive information based on a preset aggregated rule, and transmit the aggregated comments to the client; and the client is further configured to acquire the aggregated comments transmitted back by the server in response to the request, and display the aggregated comments based on a preset displaying method.

In some embodiments, the client is further configured to transmit the request for acquiring the multimedia interactive information to be displayed to the server; and the server is further configured to determine the number of aggregations of the aggregated comments , select the number of aggregations that satisfies a pre-defined filtering rule from the determined number of aggregations, store at least one aggregated comment corresponding to the selected number of aggregations, and transmit the stored aggregated comment to the client.

In some embodiments, the server is specifically configured to sort the aggregated comments based on the determined number of aggregations in descending order, and store at least one aggregated comment ranked within a scope of the filtering rule.

In some embodiments, the client is further configured to transmit the request for acquiring the multimedia interactive information to be displayed to the server;

the server is further configured to acquire the multimedia interactive information within a preset first threshold interval, wherein the first threshold interval is an interval for refreshing the multimedia interactive information; generate a first aggregated comment through statistics for the same types of entries of multimedia interactive information in the multimedia interactive information based on the preset aggregated rule; and transmit the first aggregated comment to the client; and the client is further configured to acquire the first aggregated comment transmitted back by the server in response to the request, and display the first aggregated comment in a bullet screen region.

In some embodiments, the client is further configured to transmit the request for acquiring the multimedia interactive information to be displayed to the server;

the server is further configured to acquire second aggregated comment within a preset second threshold interval based on the aggregated rule, wherein the second threshold interval is a next interval adjacent to the first threshold interval; compare whether the first aggregated comment is the same as the second aggregated comment; generate a third aggregated comment by aggregating the second aggregated comment and the first aggregated comment based on that the first aggregating comment is same with the second aggregated comment, and transmit the third aggregated comment to the client; and transmit the second aggregated comment to the client, when the first aggregated comment is different from the second aggregated comment; and the client is further configured to acquire the third aggregated comment transmitted back by the server in response to the request, and display the third aggregated comment in the bullet screen region, or acquire the second aggregated comment transmitted back by the server in response to the request, and display the second aggregated comment in the bullet screen region.

In some embodiments, the client is further configured to transmit a sharing path for sharing data to the server; and the server is further configured to acquire the sharing path for a user to share the data, and publish the aggregated comments in a comment region of the sharing path according to the sharing path.

Through statistics for entries of same types of multimedia interactive information in the multimedia interactive information to be displayed based on a preset aggregated rule, the data volume in the comment information is compressed and gathered and repeated comments are greatly reduced, thereby reducing the complexity of the aggregated comment information and substantially increasing the amount of information.

In order to solve the problem in the prior art, the embodiment further provides a server. Specifically referring to FIG. 12, FIG. 12 is a block diagram of a basic structure of the server of the embodiment.

Figure 12:
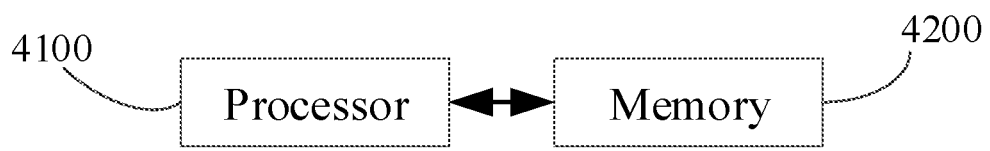
FIG. 12 illustrates a block diagram of a basic structure of a server according to an embodiment of the disclosure.

As shown in FIG. 12, the server includes:
one or more processors 4100;
a memory 4200; and
one or more application programs, where the one or more application programs are stored in the memory 4200 and configured to be executed by the one or more processors 4100. The one or more application programs are configured to execute the following method:

acquiring multimedia interactive information to be displayed;

generating aggregated comments through statistics for entries of same types of multimedia interactive information in the multimedia interactive information based on a preset aggregated rule; and transmitting the aggregated comments to a client for displaying.

Through statistics for entries of same types of multimedia interactive information in the multimedia interactive information to be displayed based on a preset aggregated rule, the server compresses and gathers the data volume in the comment information and reduces repeated comments greatly, thereby reducing the complexity of the aggregated comment information and substantially increasing the amount of information.

In the embodiment, all procedures configured to implement the method for aggregating and displaying comments for a server side in the present embodiment are stored in the memory of the server, and the processors may call the procedures in the memory to implement all the functions listed in the above-mentioned method for aggregating and displaying comments. The functions realized by the server have been described in detail in the method for aggregating and displaying comments in the present embodiment, and thus are not repeated here in more details.

Figure 13:
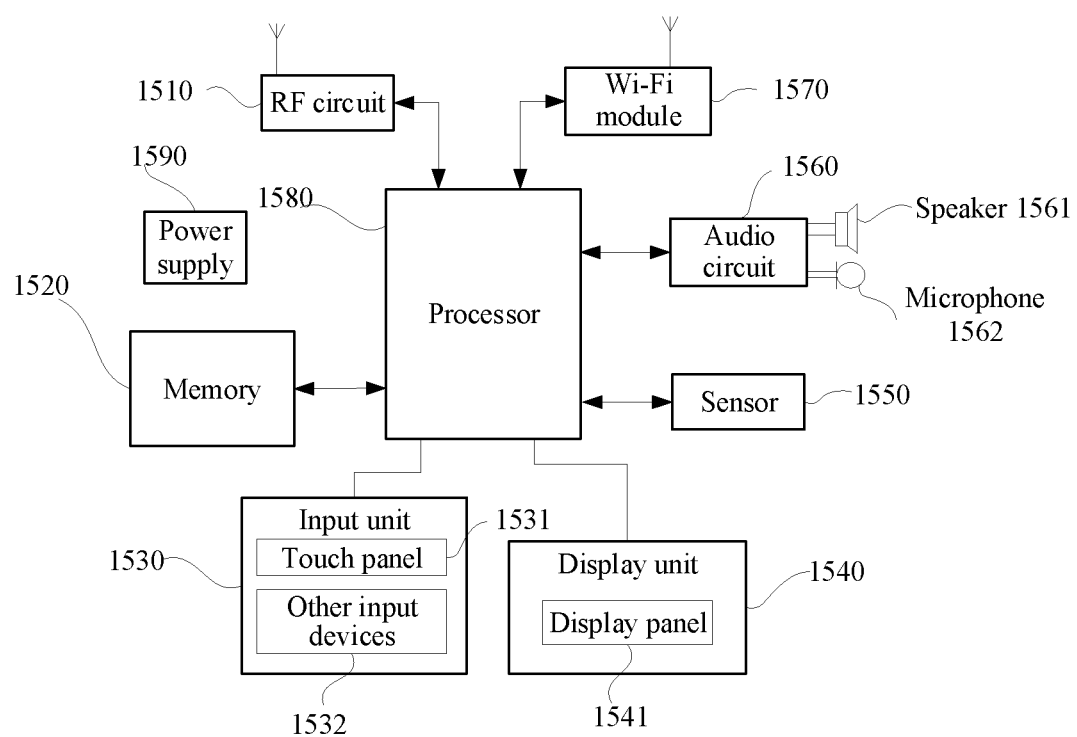
FIG. 13 illustrates a schematic diagram of a basic structure of an intelligent terminal according to an embodiment of the disclosure.

The present embodiment further provides an intelligent terminal. Specifically referring to FIG. 13, FIG. 13 is a schematic diagram of a basic structure of the intelligent terminal according to the present embodiment. The intelligent terminal provided by the present embodiment includes a client in the above embodiment.

In the present embodiment, all procedures configured to implement the method for aggregating and displaying comments for a terminal side in the present embodiment are stored in a memory 1520 of the intelligent terminal, and processors 1580 may call the procedures in the memory 1520 to implement all the functions listed in the above-mentioned method for aggregating and displaying comments. The functions realized by the intelligent terminal have been described in detail in the method for aggregating and displaying comments in the present embodiment, and thus are not repeated here in more details.

The embodiments of the present disclosure further provide an intelligent terminal, as shown in FIG. 13. For the convenience in illustration, parts related to the embodiments of the present disclosure are shown only. Specific technical details that are not disclosed should refer to the method part of the embodiments of the present disclosure. The terminal may be any terminal device including a PC end, an intelligent terminal, a tablet computer, a Personal Digital Assistant (PDA), a Point of Sales (POS), a vehicle-mounted computer, etc. The terminal being the intelligent terminal is taken as an example.

FIG. 13 illustrates a block diagram of partial structures of the intelligent terminal, which are related to the terminal provided by the embodiments of the present disclosure. Referring to FIG. 13, the intelligent terminal includes: a Radio Frequency (RF) circuit 1510, a memory 1520, an input unit 1530, a display unit 1540, a sensor 1550, an audio circuit 1560, a wireless fidelity (Wi-Fi) module 1570, a processor 1580, and a power supply 1590, etc. Those skilled in the art can understand that the structures of the intelligent terminal shown in FIG. 13 do not constitute a limitation to the intelligent terminal, and may include more or fewer parts than those shown in the figure, or combine some parts, or arrange different parts.

The various constituting parts of the intelligent terminal will be specifically introduced below in conjunction with FIG. 13.

The RF circuit 1510 may be configured to receive and transmit signals in an information transmitting and receiving process or a communication process. Particularly, downlink information of a base station is provided to the processor 1580 for processing after being received. In addition, it will be designed that uplink data are transmitted to the base station. Generally, the RF circuit 1510 includes, but is not limited to, an antenna, at least one amplifier, a transceiver, a coupler, a Low Noise Amplifier (LNA), a duplexer, and the like. In addition, the RF circuit 1510 may also communicate with a network and other devices by means of wireless communication. The above wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.sss The memory 1520 may be configured to store software and modules. The processor 1580 runs the software and modules stored in the memory 1520 to execute various functional applications and data processing of the intelligent terminal. The memory 1520 may mainly include a program storage region and a data storage region. The program storage region may store an operating system, at least one function required application program (such as a sound playback function and an image playback function), and the like. The data storage region may store data (such as audio data and a phone book) created according to the use of the intelligent terminal. In addition, the memory 1520 may include a high-speed random access memory, and may further include a non-volatile memory, such as at least one magnetic disk storage device, a flash memory device, or other volatile solid-state storage devices.

The input unit 1530 may be configured to receive input numeric or character information, and generate key signal inputs related to user settings and function control of the intelligent terminal. Specifically, the input unit 1530 may include a touch panel 1531 and other input devices 1532. The touch panel 1531, also referred to as a touch screen, may collect user's touch operations on or near it (for example, the user uses a finger, a stylus or any suitable object or accessory to perform operations on or near the touch panel 1531), and drive a corresponding connection apparatus according to a preset program. Optionally, the touch panel 1531 may include two parts: a touch detection apparatus and a touch controller. The touch detection apparatus detects a touch orientation of a user, detects a signal brought by the touch operation, and transmits the signal to the touch controller. The touch controller receives touch information from the touch detection apparatus, converts it into contact coordinates, and sends the contact coordinates to the processor 1580, and may receive and execute commands sent by the processor 1580. In addition, the touch panel 1531 may be implemented by using various types such as a resistive type, a capacitive type, an infrared type, and a surface acoustic wave. In addition to the touch panel 1531, the input unit 1530 may further include other input devices 1532. Specifically, the other input devices 1532 may include, but are not limited to, one or more of a physical keyboard, function keys (such as volume control keys and a switch key), a trackball, a mouse, an operation lever, and the like.

The display unit 1540 may be configured to display information input by the user or information provided to the user and various menus of the intelligent terminal. The display unit 1540 may include a display panel 1541, which may be, optionally, configured in the form of a Liquid Crystal Display (LCD), an Organic Light-Emitting Diode (OLED), and the like. Further, the touch panel 1531 may cover the display panel 1541. When the touch panel 1531 detects the touch operation on or near it, the touch panel 1531 transmits the touch operation to the processor 1580 to determine the type of a touch event. Then, the processor 1580 provides a corresponding vision output on the display panel 1541 according to the type of the touch event. Although, in FIG. 13, the touch panel 1531 and the display panel 1541 are two separate components to realize the input and input functions of the intelligent terminal, in some embodiments, the touch panel 1531 and the display panel 1541 may be integrated to realize the input and output functions of the intelligent terminal.

The intelligent terminal may further include at least one sensor 1550, such as a light sensor, a motion sensor, and other sensors. Specifically, the light sensor may include an ambient light sensor and a proximity sensor. The ambient light sensor may adjust the brightness of the display panel 1541 according to the brightness of ambient light. The proximity sensor may shut down the display panel 1541 and/or the backlight when the intelligent terminal is moved to an ear. As one kind of a motion sensor, an accelerometer sensor may detect accelerations in various directions (usually triaxial), and may detect the magnitude and direction of the gravity when it is stationary. This sensor may be configured to identify applications of intelligent terminal attitudes (such as horizontal and vertical screen switching, related games, magnetometer attitude calibration), vibration recognition related functions (such as a pedometer, tap), and the like. The intelligent terminal may also be provided with a gyroscope, a barometer, a hygrometer, a thermometer, an infrared sensor and other sensors, and descriptions thereof are omitted here.

The audio circuit 1560, a speaker 1561 and a microphone 1562 may provide an audio interface between the user and the intelligent terminal. The audio circuit 1560 may convert received audio data into an electrical signal and transmit the signal to the speaker 1561, and the electrical signal is converted into a sound signal by the speaker 1561 and then output. On the other hand, the microphone 1562 converts the collected sound signal into an electrical signal, and the audio circuit 1560 converts the electrical signal into the audio data after receiving the electrical signal, and then the audio data is output to the processor 1580 for processing and sent to, such as, another intelligent terminal through the RF circuit 1510, or the audio data is output to the memory 1520 for further processing.

Wi-Fi is a short-range wireless transmission technology. The intelligent terminal may help the user send and receive e-mails, browse web pages and access streaming media through the Wi-Fi module 1570, and provides the user with wireless broadband Internet accesses. Although FIG. 13 shows the WiFi module 1570, it can be understood that this module does not belong to necessary configuration of the intelligent terminal, and may be omitted as needed without changing the essence of the present disclosure.

The processor 1580 is a control center of the intelligent terminal, and uses various interfaces and lines to connect the various parts of the entire intelligent terminal. The processor 1580 runs or executes the software and/or modules stored in the memory 1520, and calls the data stored in the memory 1520 to execute various functions of the intelligent terminal and process the data, so as to monitor the entire intelligent terminal. Optionally, the processor 1580 may include one or more processing units. Optionally, the processor 1580 may integrate an application processor and a modem processor. The application processor mainly processes an operating system, a user interface, an application program and the like, and the modem processor mainly deals with wireless communication. It can be understood that the foregoing modem processor may not be integrated into the processor 1580, either.

The intelligent terminal further includes a power supply 1590 (such as a battery) for supplying power to the various components. Preferably, the power supply may be logically connected to the processor 1580 through a power management system, thereby realizing functions of managing charging, discharging and power management and the like through the power management system.

Although not shown, the intelligent terminal may further include a camera, a Bluetooth module, and the like, and descriptions thereof are omitted here.

It should be noted that in this context, relational terms such as first and second are used merely to distinguish one entity or operation from another entity or operation, instead of necessarily requiring or implying that these entities or operations have any of these actual relationships or orders. Furthermore, terms "include", "including" or any other variants are meant to cover non-exclusive inclusions, so that a process, method, object or device that includes a series of elements not only includes those elements, but also includes other elements which are not definitely listed, or further includes inherent elements of this process, method, object or device. Without more restrictions, elements defined by a sentence "includes a/an . . . " do not exclude that the process, method, object or device that includes the elements still includes other identical elements.

The various embodiments in this specification are described in a related manner. The same or similar parts between the various embodiments can be referred to each other, and each embodiment focuses on the differences from other embodiments. In particular, for the embodiments of a pedestrian passage gate control device, a pedestrian passage gate, an authority controller, and a machine-readable storage medium, since they are basically similar to the embodiment of a pedestrian passage gate control method, the their descriptions are relatively simple. Related parts refer to partial descriptions of the method embodiment.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

What is claimed is:

1. A method for aggregating and displaying comments, comprising:
   obtaining interactive information in a platform of a client;
   generating aggregated comments based on types of the interactive information;
   publishing the aggregated comments in a bullet screen region of the platform of the client;
   obtaining a sharing path, wherein the sharing path is configured to share the aggregated comments to other sharing platforms of the client, and comprises network links for accessing the other sharing platforms; wherein the platform is different from the other sharing platforms; and
   publishing the aggregated comments in a comment area of the other sharing platforms based on the sharing path.

2. The method according to claim 1, further comprising:
   sorting the aggregated comments in descending order based on the number of aggregations; and
   storing at least one aggregated comment which satisfies a pre-defined filtering rule.

3. The method according to claim 1, further comprising:
   obtaining the interactive information within a preset first threshold interval;
   generating a first aggregated comment with same types of interactive information in the interactive information based on the preset aggregated rule; and
   transmitting the first aggregated comment to the client for displaying in the bullet screen region.

4. The method according to claim 3, further comprising:
   obtaining a second aggregated comment within a preset second threshold interval based on the preset aggregated rule;
   comparing whether the first aggregated comment is the same as the second aggregated comment;
   generating a third aggregated comment by aggregating the second aggregated comment and the first aggregated comment based on that the first aggregating comment is same with the second aggregated comment; and
   transmitting the third aggregated comment to the client.

5. The method according to claim 3, further comprising:
   obtaining a second aggregated comment within a preset second threshold interval based on the preset aggregated rule;
   comparing whether the first aggregated comment is the same as the second aggregated comment; and
   transmitting the second aggregated comment to the client based on that the first aggregated comment is different from the second aggregated comment.

6. A method for aggregating and displaying comments, comprising:
   transmitting a request for obtaining interactive information in a platform to a server, wherein the server is configured to generate aggregated comments based on types of the interactive information in response to the request;
   obtaining the aggregated comments transmitted from the server;
   displaying the aggregated comments in a bullet screen region of the platform; and
   transmitting a sharing path to the server, wherein the sharing path is configured to share the aggregated comments to other sharing platforms different from the platform, and comprises network links for accessing the other sharing platforms; wherein the server is configured to publish the aggregated comments in a comment area of the other sharing platforms based on the sharing path.

7. The method according to claim 6, further comprising:
   the server is configured to sort the aggregated comments in descending order based on the number of aggregations; and store at least one aggregated comment which satisfies a pre-defined filtering rule in response to the request.

8. The method according to claim 6, further comprising:
   transmitting the request to the server, wherein the server is configured to, within a preset first threshold interval, generate a first aggregated comment with same types of interactive information in the interactive information based on the preset aggregated rule in response to the request;
   obtaining the first aggregated comment transmitted from the server; and
   displaying the first aggregated comment in [a]the bullet screen region.

9. The method according to claim 8, further comprising:
   transmitting the request to the server, wherein the server is configured to, within a preset second threshold interval, generate a second aggregated comment with same types of interactive information in the interactive information based on the preset aggregated rule in response to the request;
   wherein the server is configured to compare the first aggregated comment with the second aggregated comment, and generate a third aggregated comment by aggregating the second aggregated comment and the first aggregated comment based on that the first aggregating comment is same with the second aggregated comment;
obtaining the third aggregated comment transmitted from the server; and
displaying the third aggregated comment in the bullet screen region.

10. The method according to claim 8, further comprising:
transmitting the request to the server, wherein the server is configured to, within a preset second threshold interval, generate a second aggregated comment with same types of interactive information in the interactive information based on the preset aggregated rule in response to the request; wherein the server is configured to compare the first aggregated comment with the second aggregated comment, and transmit the second aggregated comment to the client based on that the first aggregated comment is different from the second aggregated comment;
obtaining the second aggregated comment transmitted from the server; and
displaying the second aggregated comment in the bullet screen region.

11. A system for aggregating and displaying comments, comprising:
one or more processors; and
a memory; and
the one or more processors are configured to read application programs in the memory to:
obtain interactive information in a platform of a client;
generate aggregated comments based on types of the interactive information;
publish the aggregated comments in a bullet screen region of the platform of the client;
obtain a sharing path, wherein the sharing path is configured to share the aggregated comments to other sharing platforms of the client, and comprises network links for accessing the other sharing platforms; wherein the platform is different from the other sharing platforms; and
publish the aggregated comments in a comment area of the other sharing platforms based on the sharing path.

12. The system according to claim 11, wherein the one or more processors are configured to read application programs in the memory to:
sort the aggregated comments in descending order based on the number of aggregations; and
store at least one aggregated comment which satisfies a pre-defined filtering rule.

13. The system according to claim 11, wherein the one or more processors are configured to read application programs in the memory to:
obtain the interactive information within a preset first threshold interval;
generate a first aggregated comment with same types of interactive information in the interactive information based on the preset aggregated rule; and
transmit the first aggregated comment to the client for displaying in the bullet screen region.

14. The system according to claim 13, wherein the one or more processors are configured to read application programs in the memory to:
obtain a second aggregated comment within a preset second threshold interval based on the preset aggregated rule;
compare whether the first aggregated comment is the same as the second aggregated comment; and
generate a third aggregated comment by aggregating the second aggregated comment and the first aggregated comment based on that the first aggregating comment is same with the second aggregated comment; and
transmit the third aggregated comment to the client.

15. The system according to claim 13, wherein the one or more processors are configured to read application programs in the memory to:
obtain a second aggregated comment within a preset second threshold interval based on the preset aggregated rule;
compare whether the first aggregated comment is the same as the second aggregated comment; and
transmit the second aggregated comment to the client based on that the first aggregated comment is different from the second aggregated comment.

* * * * *

UNITED STATES PATENT AND TRADEMARK OFFICE
CERTIFICATE OF CORRECTION

PATENT NO. : 11,216,523 B2
APPLICATION NO. : 16/907938
DATED : January 4, 2022
INVENTOR(S) : Zhang et al.

Page 1 of 1

It is certified that error appears in the above-identified patent and that said Letters Patent is hereby corrected as shown below:

In the Claims

In Column 24, Line 55, the text --in [a]the bullet-- should be --in the bullet--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*